US006444976B1

(12) United States Patent
Ishikawa et al.

(10) Patent No.: US 6,444,976 B1
(45) Date of Patent: Sep. 3, 2002

(54) SYSTEM AND METHOD FOR REFLECTING AND DEFLECTING LIGHT UTILIZING SPHERICAL SHAPED DEVICES

(75) Inventors: Akira Ishikawa, Royse City; Takashi Kanatake, Dallas; Wenhui Mei, Richardson, all of TX (US)

(73) Assignee: Ball Semiconductor, Inc., Allen, TX (US)

( * ) Notice: Subject to any disclaimer, the term of this patent is extended or adjusted under 35 U.S.C. 154(b) by 0 days.

(21) Appl. No.: 09/558,965

(22) Filed: Apr. 25, 2000

(51) Int. Cl.[7] ................................. G01D 5/34
(52) U.S. Cl. ................... 250/229; 250/216; 250/228; 356/236
(58) Field of Search ................ 250/216, 228, 250/229; 356/236

(56) References Cited

U.S. PATENT DOCUMENTS

| | | | | |
|---|---|---|---|---|
| 4,487,504 A | * | 12/1984 | Goldsmith | 356/323 |
| 4,751,712 A | * | 6/1988 | Pax et al. | 372/20 |
| 4,853,542 A | * | 8/1989 | Milosevic et al. | 250/353 |
| 5,198,096 A | * | 3/1993 | Foust et al. | 205/164 |
| 5,212,745 A | * | 5/1993 | Miller | 385/25 |
| 5,438,879 A | * | 8/1995 | Reda | 73/800 |
| 5,627,668 A | * | 5/1997 | Fye | 359/122 |
| 6,198,856 B1 | * | 3/2001 | Schroeder et al. | 385/16 |

OTHER PUBLICATIONS http://www.agilent.com/about/feature/photonic.html, "Agilent Technologies:Introducing the Agilent Photonic Switching Platform", Apr. 19, 2000.

* cited by examiner

Primary Examiner—Robert H. Kim
Assistant Examiner—Courtney Thomas
(74) Attorney, Agent, or Firm—Haynes and Boone, LLP (57) ABSTRACT

A system and method of utilizing spherical and hemispherical shaped devices to function as an optical switch is disclosed. The optical switch can contain mirrors that turn on and off, or are fixed in place with a movable spherical device. Additionally, the optical switches can contain grating patterns to deflect an optical signal from its original path. The grating patterns can vary in design and pattern to deflect the optical signal in almost any direction, or to not let the optical signal continue. The optical switch can also include photo sensors along the exterior of the sphere or along the reflection device. The optical switch can also include an integrated circuits.

25 Claims, 11 Drawing Sheets

SYSTEM AND METHOD FOR REFLECTING AND DEFLECTING LIGHT UTILIZING SPHERICAL SHAPED DEVICES

FIELD OF THE INVENTION

The present invention relates to an optical switch having an optical transmission path with an optical transmission medium, a radiation source associated with an input-side end of the optical transmission path for emitting a primary optical signal being coupled into the transmission path, and a optical switch between the input-side and an output-side end of the transmission path.

CROSS REFERENCE

U.S. patent application Ser. No. 09/557,654, filed herewith, entitled "System and Method for Refracting and Deflecting Light Utilizing Liquid Crystal Bars and Blocks" is hereby incorporated by reference as if reproduced in its entirety.

In U.S. Pat. No. 5,955,776, assigned to the same assignee as the present application and hereby incorporated by reference as if reproduced in its entirety, a method and system for manufacturing spherical-shaped semiconductor integrated circuits is disclosed. A manufacturing process disclosed in the aforementioned patent is used to create and process semiconductor spheres, such as may be used for spherical-shaped semiconductor integrated circuits.

In U.S. patent application Ser. No. 09/483,640, filed on Jan. 14, 2000, assigned to the same assignee as the present application and hereby incorporated by reference as if reproduced in its entirety, a method of making small gaps for small electrical/mechanical devices is disclosed.

BACKGROUND OF THE INVENTION

Known optical switches use two fiberoptical waveguides, specifically one fiber for an outgoing path and one fiber for a return path of the optical signal. In the switching operation, as a rule, the location of a suitably constructed reflector is changed in such a way that either it couples the light signal from one fiber into the other fiber, or it interrupts an already existing coupling of the light signal and/or redirects it into another fiber.

Figure 1:
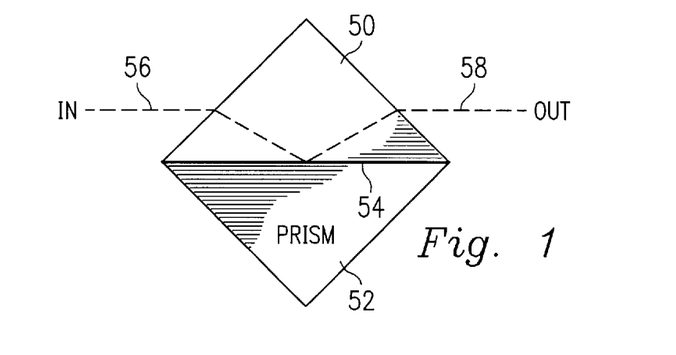
FIG. 1 illustrates a conventional optical switch with the mirror activated.

FIG. 1 shows a first prism 50 glued together with optical glue to a second prism 52. The optical glue forms a mirror 54 that reflects an incoming signal 56 into an outgoing signal path 58.

Figure 2:
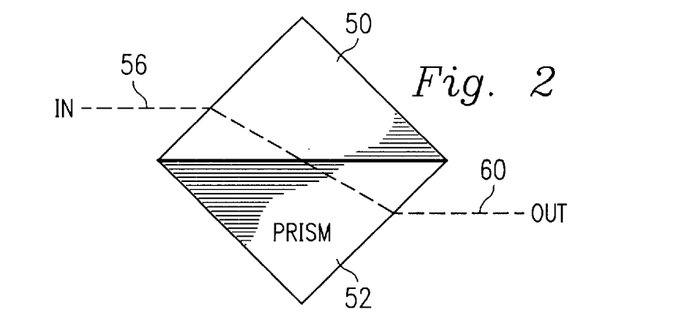
FIG. 2 illustrates a conventional optical switch with the mirror off.

FIG. 2 shows the same first prism 50 attached to the same second prism 52, but this embodiment does not have the mirror found in FIG. 1. Therefore, as the incoming signal 56 goes through the first prism 50, the signal does not get reflected, but passes through the second prism 52 into the second outgoing signal 60.

Although other embodiments exist for optical switches and many different methods exist to turn on and off the mirror between the two prisms, FIGS. 1 and 2 show the basic concepts of optical switching.

However, the current optical switches and methods have much room for improvement in cost, size and speed in order to enable the optical networks of the future.

Another technology explores the conventional concepts of integrated circuits, or "chips". Chips are usually formed from a flat surface semiconductor wafer. The semiconductor wafer is first manufactured in a semiconductor material manufacturing facility and is then provided to a fabrication facility. At the latter facility, several layers are processed onto the semiconductor wafer surface. Once completed, the wafer is then cut into one or more chips and assembled into packages. Although the processed chip includes several layers fabricated thereon, the chip still remains relatively flat.

SUMMARY OF THE INVENTION

The present invention, accordingly, provides an apparatus, system, and method for utilizing semiconductor spheres in a new and improved optical switch. A system and method of utilizing spherical, hemispherical and other portions of a spherical shaped devices to function as an optical switch is disclosed. The optical switch can contain mirrors that turn on and off, or are fixed in place with a movable spherical device. Additionally, the optical switches can contain grating patterns to deflect an optical signal from its original path. The grating patterns can vary in design and pattern to deflect the optical signal in almost any direction, or to not let the optical signal continue. The optical switch can also include photo sensors along the exterior of the sphere or along the reflection device. The optical switch can also include an integrated circuits.

An object of the present invention is to provide optical switches that deflect, reflect and absorb optical signals utilizing a multitude of methods and systems.

Additionally, another object of the present invention is to provide intelligence to optical switches.

Further, another object of the present invention is to provide inexpensive methods and systems for optical switching in general.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 5 is a diagram of one embodiment when a mirror is turned on;

DESCRIPTION OF THE PREFERRED EMBODIMENT

The present invention can be described with several examples given below. It is understood, however, that the examples below are not necessarily limitations to the present invention, but are used to describe typical embodiments of operation.

Figure 3:
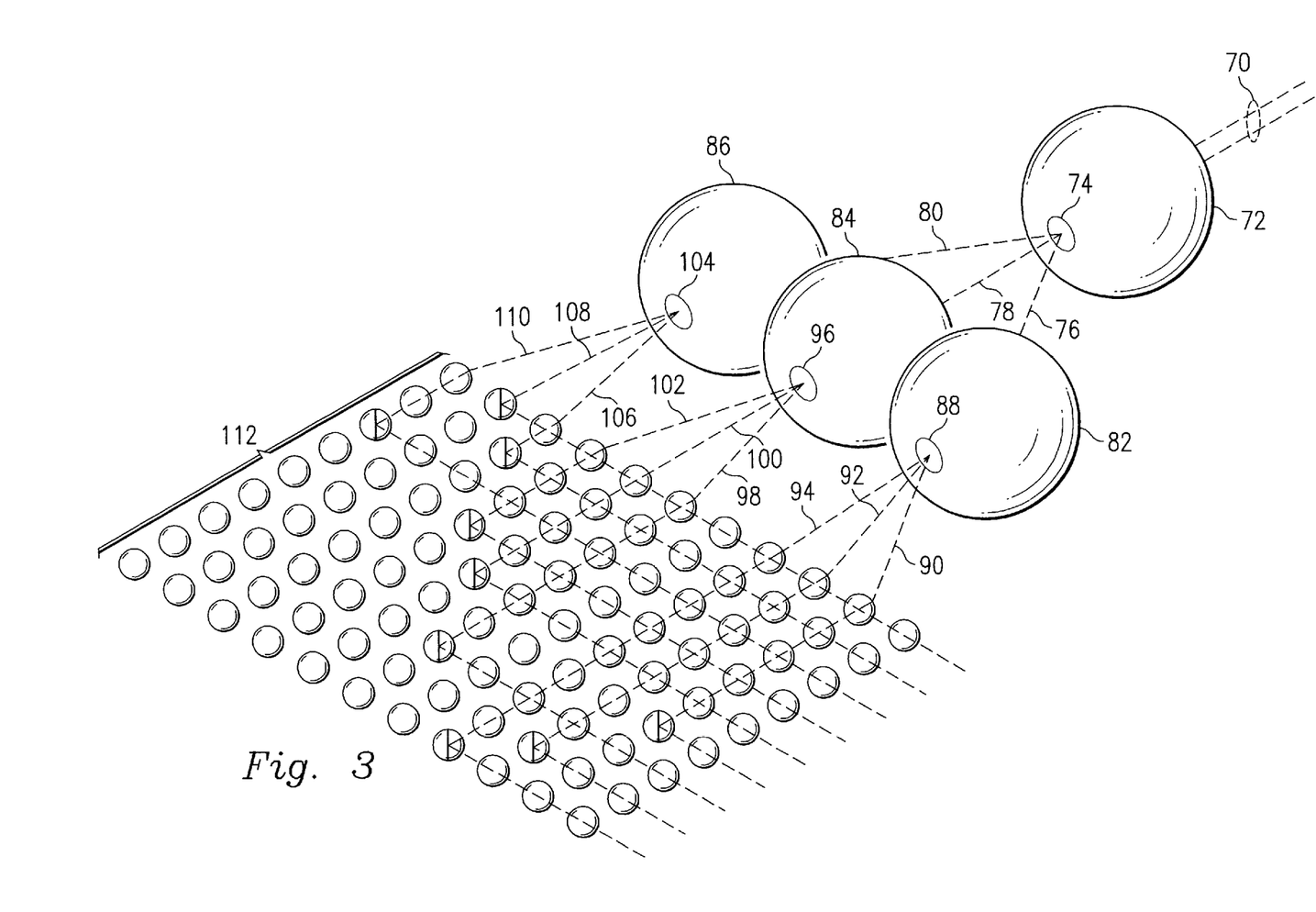
FIG. 3 is a diagram of a complex system of optical components.

Now referring to FIG. 3, an optical cable 70 is shown as input into a grating wave decoupler 72. The grating wave decoupler will be described in greater detail later in the text, but as can be seen, a grating 74 on one end of the sphere 72 diffracts the incoming light signal 70 into three different sets of signals 76, 78, and 80 into the set of liquid crystal (LC) grating switches 82, 84, and 86. In this example, the original signal 70 is divided into ranges of optical wavelengths by the LC grating 74 that result in Intermediate signals 76, 78 and 80.

Intermediate signal 76 is input into the first LC grating switch 82 while intermediate signals 78 and 80 are input into the second and third LC grating switches 84 and 86.

In this example, the LC grating switches are utilized as time sharing switches that output into several signals according to time. For example, intermediate signal 76 is output through the LC grate 88 as three signals 90, 92 and 94. Likewise, intermediate signal 78 is output through LC grate 96 as three signals 98, 100 and 102 and intermediate signal 80 is output through LC grate 104 as three signals 106, 108 and 110.

However, the LC grating switches can also be designed to divide the output by wavelength as well as by time. Additionally, the LC grating switches can be designed to have the grating on both sides of the sphere or just on one side. Moreover, the LC grating can be designed to alternate grates to deflect an incoming signal in different directions as the grates alternate.

Further, in this example, signals 90, 92, 94, 98, 100, 102, 106, 108 and 110 are input into the sphere light exchanger 112. The spheres inside the light exchanger 112 illustrate how a light signal can be switched from a path and made to turn ninety degrees into another path.

One example of how to make a sphere with a mirror to operate as a optical switch is to polish the sphere in half and then attach another half that has been polished by optical with optical glue. However, before the two halves are attached, a layer of LC (and photo sensors or integrated circuits if desired) is formed on one surface. The LC acts as a mirror when it is on, and is transparent when it is off.

Figure 4:
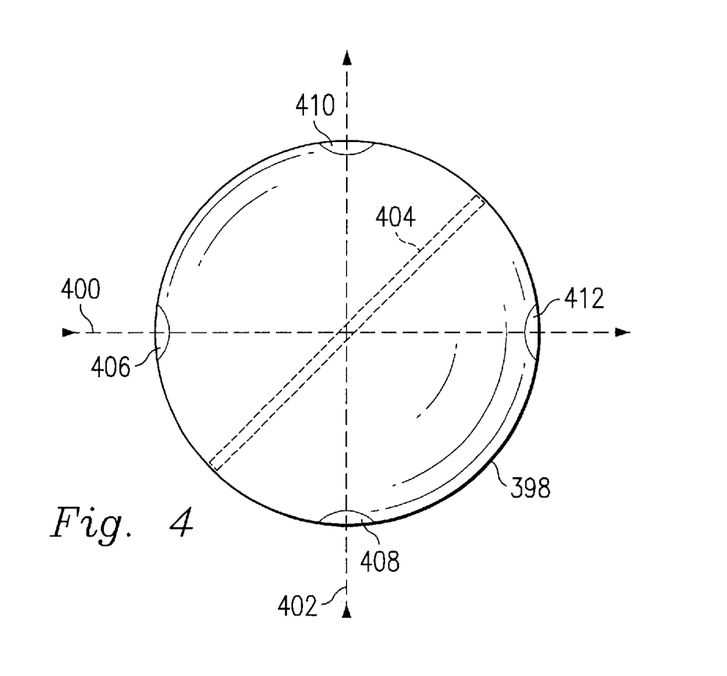
FIG. 4 is a diagram of one embodiment when a mirror is turned off.

FIG. 4 illustrates a sphere 398 with input signals 400 and 402 passing through the sphere when the LC mirror 404 is off. The input signals 400 and 402 enter into the sphere 398 through polished flat areas 406 and 408 respectively. The polished flat areas 406 and 408 ensure that no light gets diffracted because of the curvature of the sphere. Likewise, the signals 400 and 402 exit the sphere 398 through polished flat areas 410 and 412.

Figure 5:
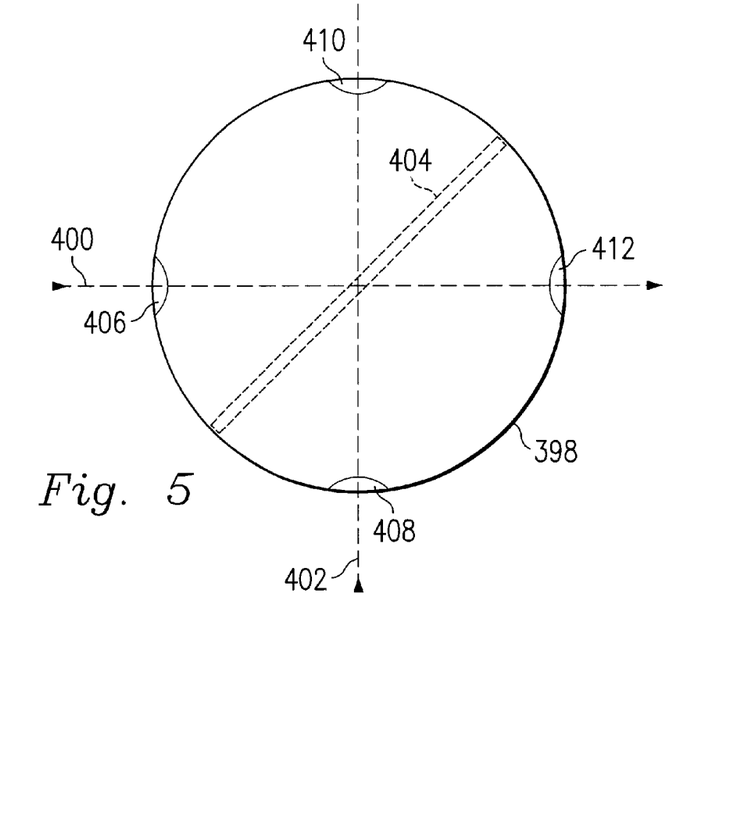

FIG. 5 illustrates the same sphere 398 as FIG. 4, but, with the LC mirror 404 on. Since the mirror 404 is on, the first signal 400 enters the sphere through polished flat area 406, is reflected at the mirror 404 and exits through polished flat area 410 ninety degrees, or perpendicular, to the angle that the signal 400 entered the sphere 398. Likewise, signal 402 enters the sphere 398 through polished flat area 408, reflects at mirror 404, and exits at polished flat area 412 ninety degrees, or perpendicular from the angle that the signal entered the sphere 398. Although, this example illustrates a ninety degree reflection, the invention is not limited to reflecting an optical signal at ninety degrees and other angles of reflection could easily be designed into the device.

Figure 6:
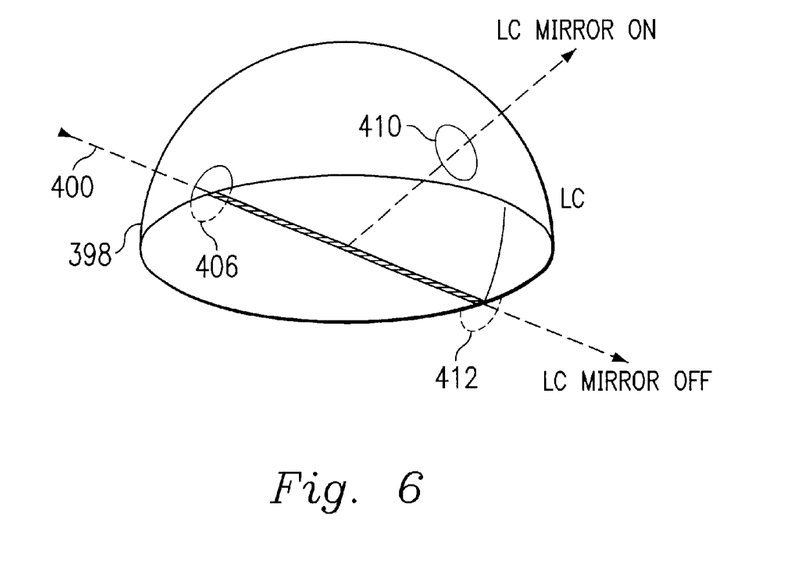
FIG. 6 is a three dimensional diagram of an embodiment similar to FIG. 5.

A three dimensional view of the sphere 398 with the LC mirror 404 is shown in FIG. 6. The signal 400 enters the sphere 398 through area 406 and exits through 412 when the mirror 404 is off. Likewise, when the mirror 404 is on, the signal 400 gets reflected and exits the sphere 398 through area 410.

Figure 7:
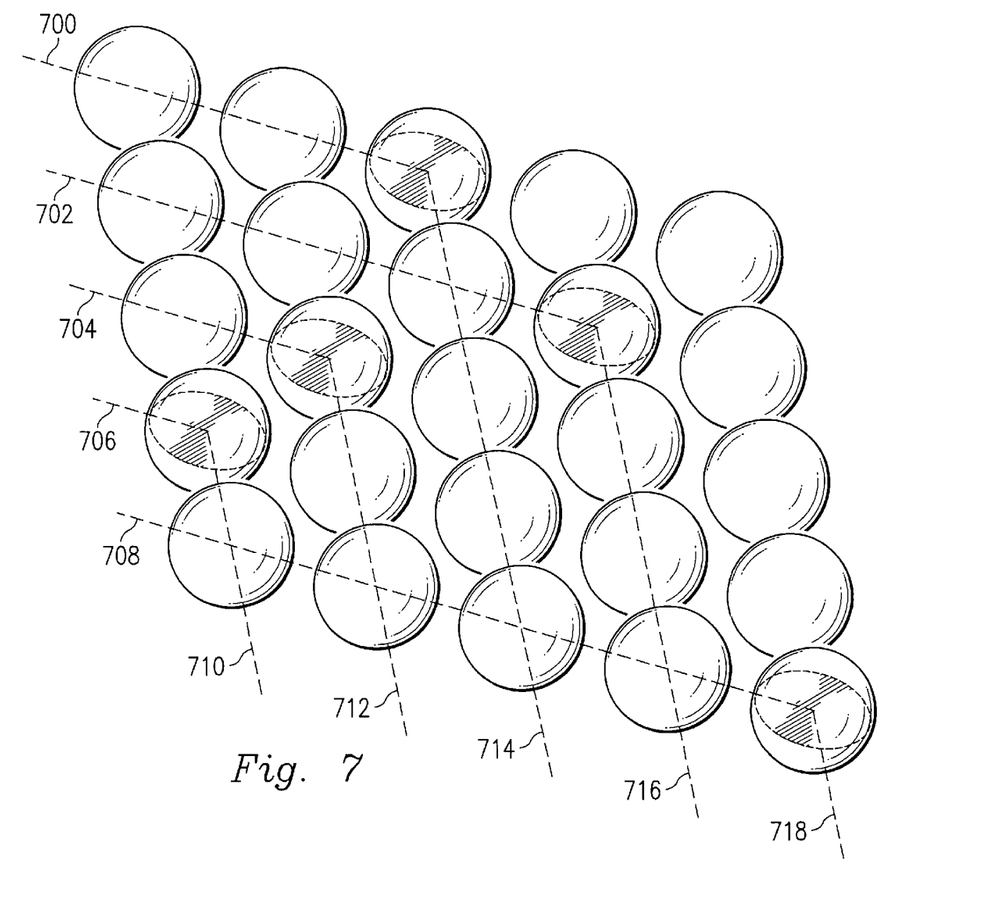
FIG. 7 is a three dimensional diagram of an embodiment with multiple spheres.

FIG. 7 illustrates an example of how a LC mirror exchanger can be embodied. Input signal 700 goes through spheres and gets reflected when it enters the third sphere because the third sphere has the mirror on. The signal then exits as output signal 714. Likewise, input signal 702 goes through three spheres with the mirrors off, and then gets reflected into output signal 716 because the fourth sphere's mirror is on. Similarly, input signal 718 goes through one sphere and gets reflected into output signal 712 at the second sphere because it's mirror is on. Input signals 706 and 708 also get reflected into output signals 710 and 718 because the first sphere and the last sphere in each path, respectively, have its' mirrors on.

Figure 8:
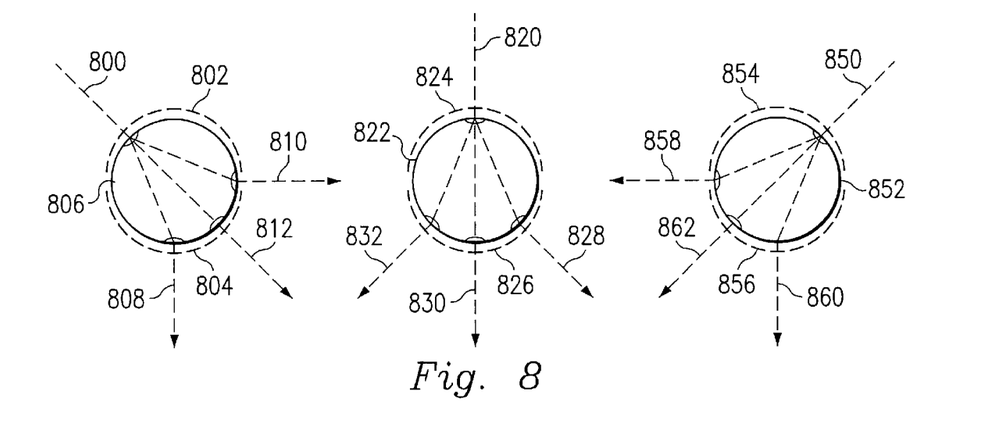
FIG. 8 is a set of diagrams of another embodiment.

FIG. 8 illustrates how the LC grating spheres can be implemented. Sphere 806 has two separate gratings 802 and 804. Depending on the spacing and width of the grating, input signal 800 can be deflected into direction 808 or 810. The grating can be made so that only grating 804 is needed to deflect the signal into either direction 808 or 810 by reversing the grating 804. However, gratings 802 and 804 can be configured so that both are required to turn on so that the signal gets deflected. With either configuration, when the grating is off, input signal 800 goes through the sphere 806 into output signal 812.

Similarly, the input signal 820 in sphere 822 goes straight through into output signal 830 when the gratings 824 and 826 are off, and gets deflected into directions 832 and 828 when at least one of the gratings 824, 826 are on.

Likewise, input signal 850 in sphere 852 goes straight through to output signal 862 when the gratings 854 and 856 are off, and gets deflected into directions 856 and 858 when at least one of the gratings 854, 856 are on.

Figure 9:
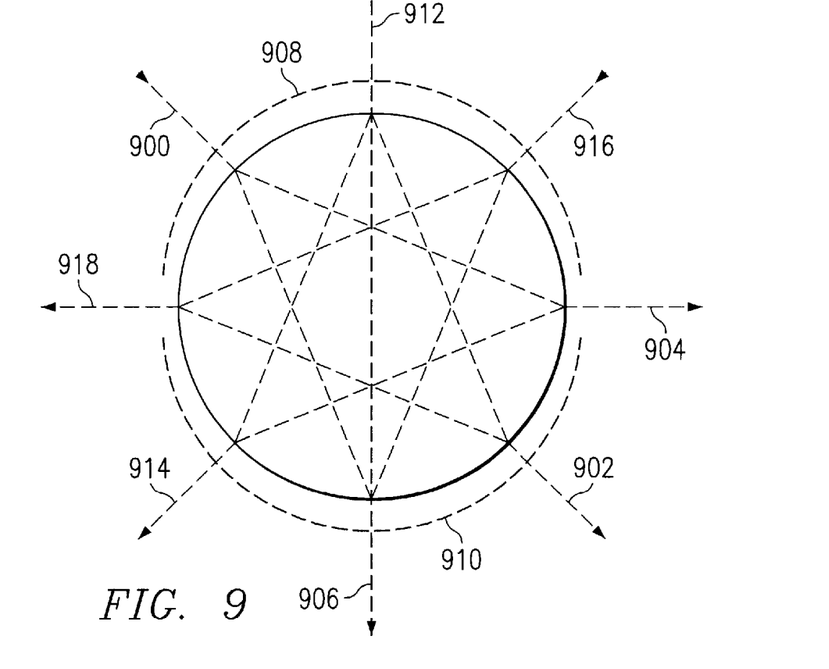
FIG. 9 is another diagram of the embodiment in FIG. 8.

These three examples are shown to illustrate how three different input signals can exit the sphere in three different directions in a combination of five possible output paths. FIG. 9 shows the combination of possible input and possible output paths. Input signal 900 can go straight through into output signal 902 or get deflected into output signals 904 or 906 when at least one grating 908 or 910 is on. Likewise, input signal 912 can go straight through into output signal 906 or get deflected into output signals 902 or 914 when at least one grating 908 or 910 is on. Similarly, input signal 916 can go straight through into output signal 914 or get deflected into output signals 906 or 918 when at least one grating 908 or 910 is on.

Figure 10:
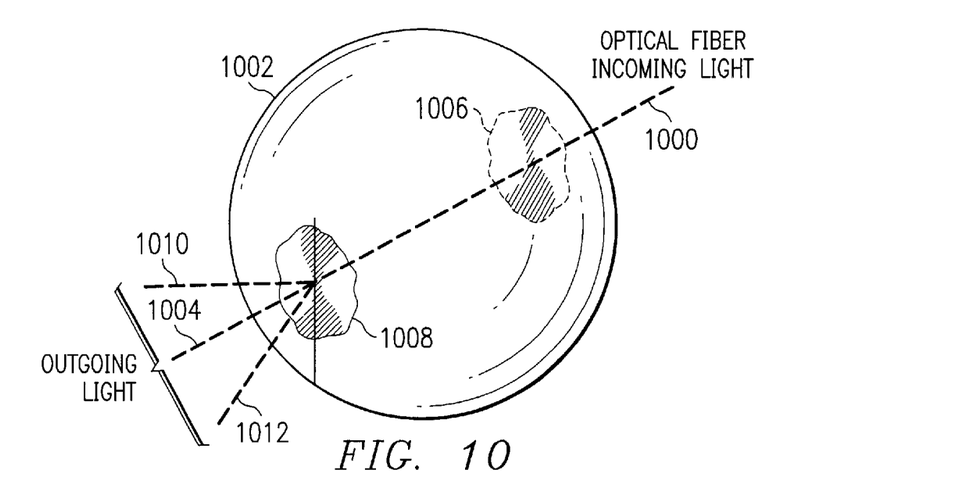
FIG. 10 is a three dimensional diagram of an embodiment similar to FIG. 8.

FIG. 10 illustrates a three dimensional example of the grating optical switch. The optical signal 1000 goes into sphere 1002 and goes straight through to output signal 1004 when the gratings 1006 and 1008 are off. When at least one grating 1006 or 1008 are on, the input signal 1000 gets deflected into output signals 1010 or 1012.

Figure 11:
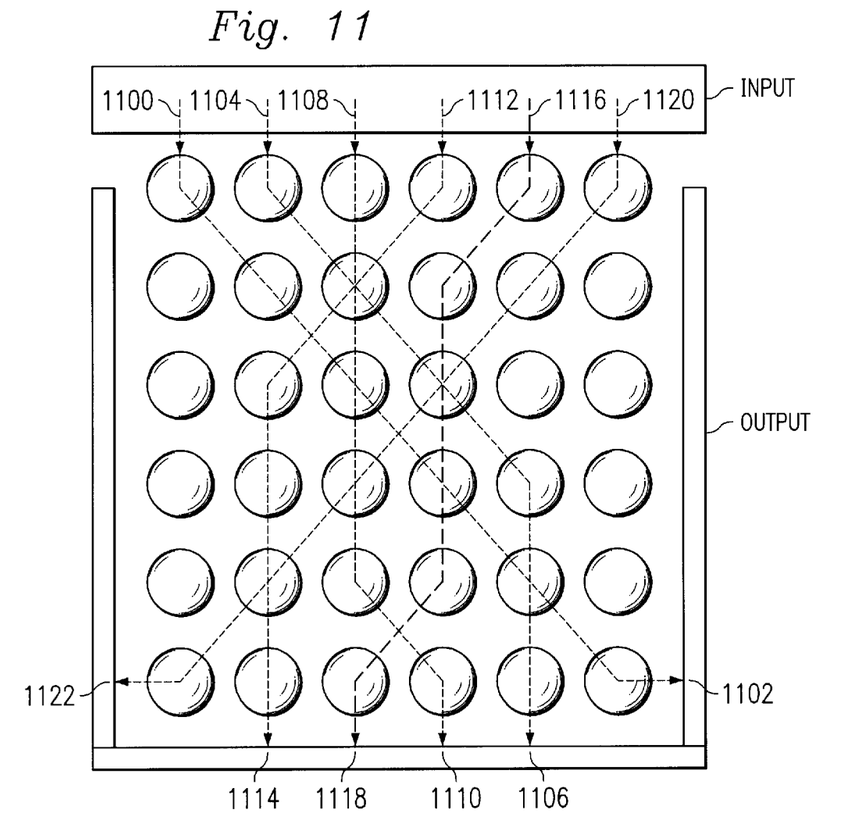
FIG. 11 is a diagram of an embodiment with multiple spheres.

FIG. 11 illustrates an implementation of a optical switch exchanger with LC grating switches. Input signal 1100 goes into the first optical grating switch and gets deflected because the grating(s) is on at the first optical switch. The signal 1100 then goes through four optical switches without getting deflected and then gets deflected at the last switch because the grating is on. The input signal 1100 then exits the exchanger as output signal 1102. Similarly, input signal 1104 gets deflected at the first optical switch and goes through two optical switches and then gets deflected when the next optical switch's grating is on. The signal 1104 then exits the exchanger as output signal 1106. The input signal 1108 goes through four optical switches without getting deflected and then gets deflected twice in a row when the next two switches have their gratings on, and exits the system as output signal 1110. Input signal 1112 gets deflected at the first switch since the grating is on, and then goes through one switch and gets deflected at the next switch and exits the exchanger as output signal 1114. Input signal 1116 gets deflected at the first and second switch because the grating is on both of them, and goes through two switches and gets deflected two more times at the next two switches since their gratings are on too. The signal 1116 then exits the exchanger as output signal 1118. Input signal 1120 gets deflected at the first switch since the grating is on, and then goes through four optical switches and gets deflected at the next switch since the grating is on. The signal 1120 then exits the exchanger as output signal 1122.

Although the example above was shown with only one input signal into each switch, as many as three input signals with the current embodiment can be input into each switch and then be either deflected or pass through depending on whether the grating is on or not.

Figure 12:
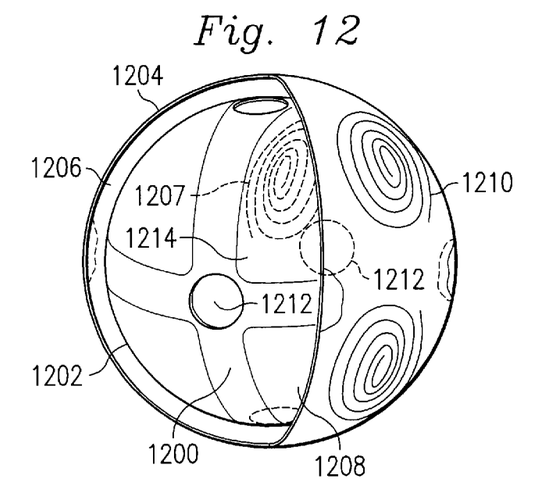
FIG. 12 is a three dimensional diagram of another embodiment.

Another embodiment of the optical switch is implemented with the use of a floating sphere within an outer shell as detailed in the incorporate by reference patent application entitled a "method of making small gaps for small electrical/mechanical devices" listed above. FIG. 12 illustrates such an implementation within the application of an optical switch. In this embodiment, the mirror 1200 is not an LC, but a more permanent mirror that gets into position by rotating the inner sphere 1202 within the outer shell 1204. A cavity 1206 is shown in between the outer shell 1204 and the inner sphere 1202.

The inner sphere 1202 is coated with a metal coating 1208 (or coil 1207) which allows the coils 1210 (or metal coating not shown) on the outer shell 1204 to levitate and rotate the inner sphere 1202 when required. The inner sphere 1202 and outer shell 1204 have a cavity 1206 that separates the two. When the coils 1210 on the outer shell 1204 are turned on, the inner sphere 1202 turns and moves the mirror 1200 to either let the optical signal pass through on the same plane, or reflect and turn the optical signal ninety degrees as shown in the previous figures. The following table illustrates a few examples of how the inner sphere 1202 can be levitated and rotated within the outer shell 1204.

|  | inner ball | shell | force |
| --- | --- | --- | --- |
| levitation | metal | coil | magnetic |
| levitation | metal | metal | electro static |
| orientation | coil | coil | magnetic |

Four windows 1212 are polished off flat on the outer shell 1204 on the same plane and ninety degrees from each other. However, the windows are not required to be polished. When the mirror 1200 is on the same plane as the optical signal and thus the four windows 1212, the optical signal is un-interrupted and the optical signal passes through the inner sphere 1208 and out the exit window 1214.

An example of how the inner sphere 1208 reflects an optical signal follows. When an optical signal passes through window 1216, it passes into the inner sphere through a corresponding window, reflects on the mirror, and passes out of the inner sphere through an opposite corresponding window on the inner sphere and out exit window 1214 on the outer sphere.

Figure 13:
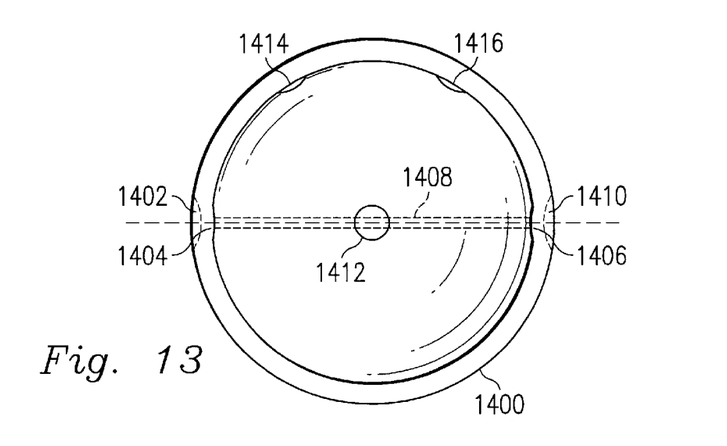
FIG. 13 is a two dimensional diagram of the embodiment in FIG. 12.

FIG. 13 shows a two dimensional example of the an optical signal going into the outer sphere through window 1402 into corresponding inner sphere window 1404 and out of inner sphere window 1406 as the mirror 1408 is on the same plane as the optical signal. The signal then exits the corresponding outer shell window 1410. Inner ball window 1412 is also on the same plane as the mirror while its corresponding inner ball exit window is not shown, but is directly on the other side of the inner ball and on the same plane as the mirror. Inner ball windows 1414 and 1416 are used to reflect light, but not used in this figure.

Figure 14A:
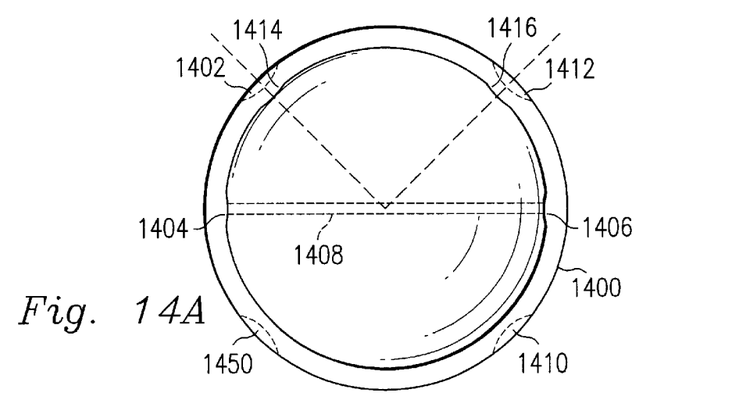
FIG. 14A is another two dimensional diagram of the embodiment in FIG. 12.

FIG. 14A shows the outer shell 1400 moved in relation to the inner ball. In this example, the optical signal enters the same outer shell window 1402, but enters inner ball window 1414 instead and then reflects off the mirror 1408 and out inner ball window 1416 and through outer shell window 1412. Although the figures show that the outer shell moved in relation to the inner ball, the inner ball actually moves in order to move the mirror in place to switch the optical signal.

Figure 14B:
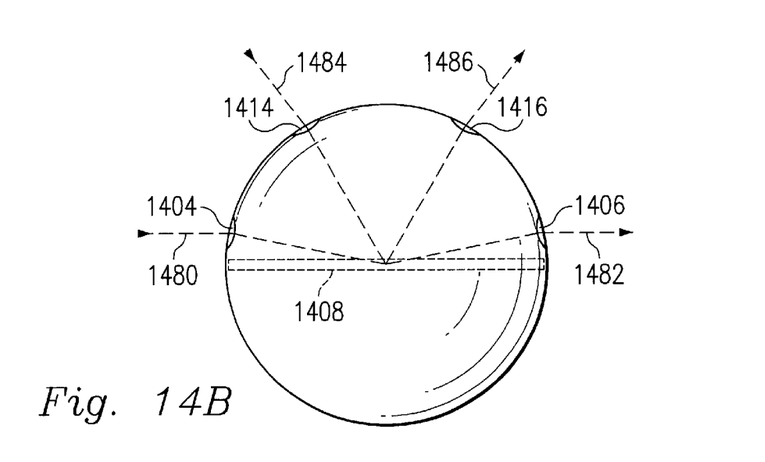
FIG. 14B is another diagram of the additionally embodiment.

FIG. 14B is another example that would have an incoming optical signal 1480 deflect because of the index of refraction of the material into the mirror 1408 and reflect into the outgoing signal 1482. Similarly, incoming signal 1484 would deflect and reflect on the mirror 1408 into outgoing signal 1486.

Figure 15:
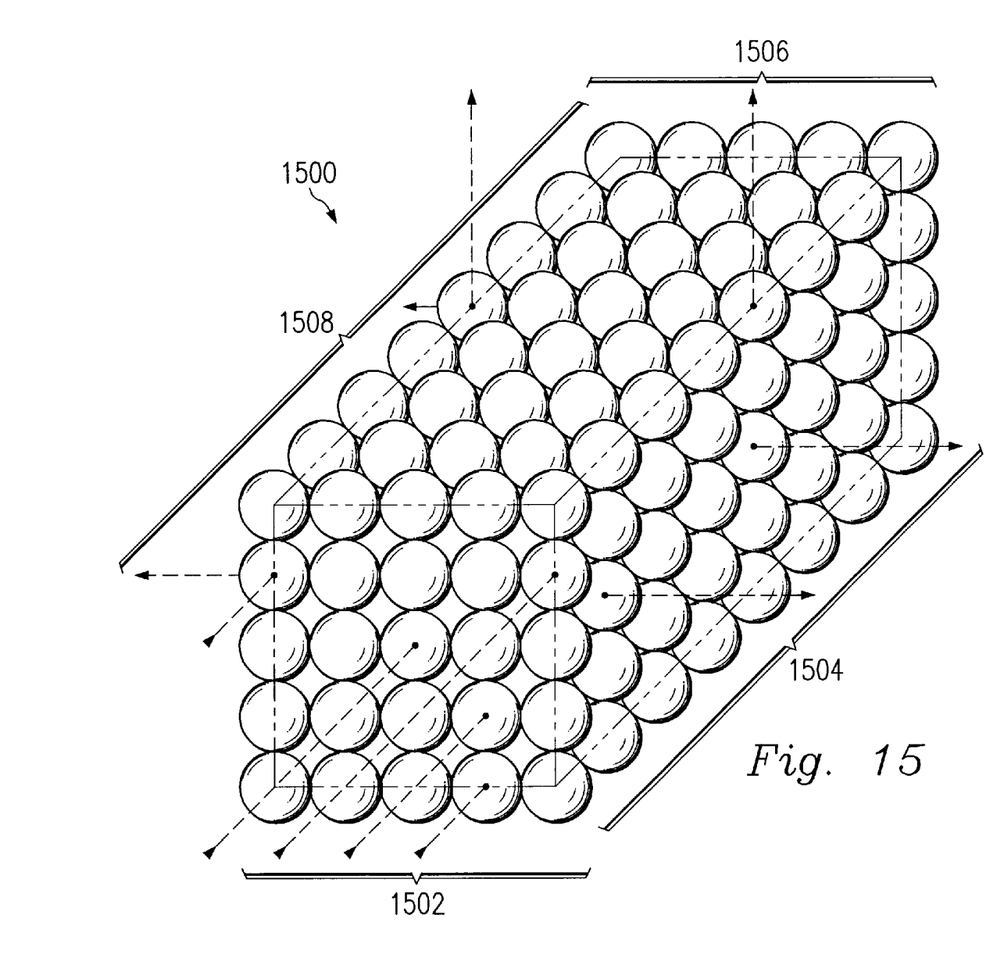
FIG. 15 is a three dimensional diagram of multiple spheres.

FIG. 15 shows an example of spherical shaped devices that either include gratings or mirrors, but are configured as a three dimensional array of spherical devices 1500. In this example, the three dimensional array of spherical devices 1500 has an input side 1502, but can output signals in any direction 1504, 1506, and 1508.

Figure 16:
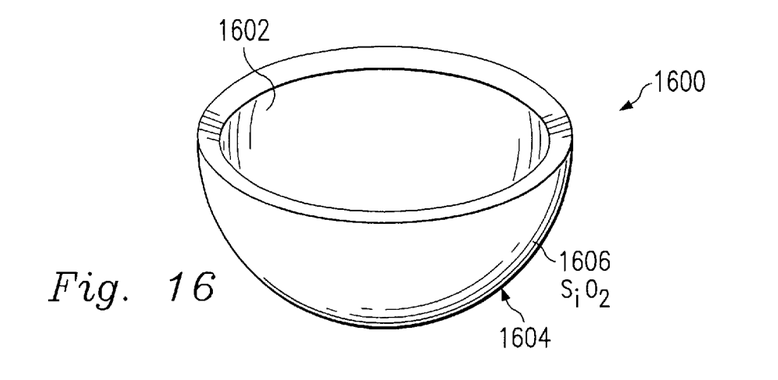
FIG. 16 is a diagram of another example embodiment.

FIG. 16 shows an example of one embodiment of the present invention. In this example, the spherical device is actually only a hemisphere 1600 and has a cavity in the center. However, a metal film 1604 is formed over the solid edges 1606 of the hemisphere. This example embodiment can replace the spherical device with a fixed mirror position. The preferred implementation of this example would include a mirror that turns on and off. This example also includes SiO2 as the material of the hemisphere.

Figure 17:
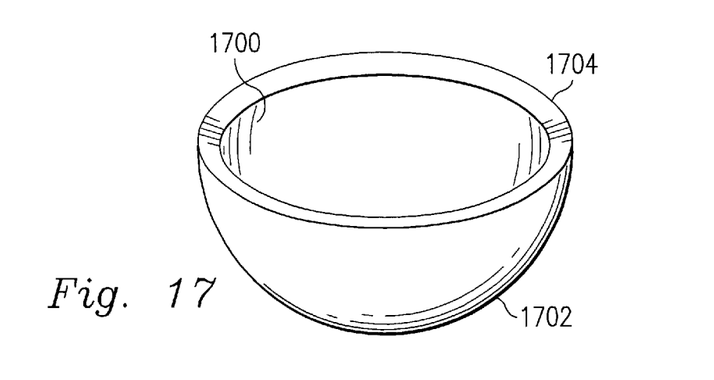
FIG. 17 is a diagram of yet another example embodiment.

FIG. 17 shows a cavity 1700 within a spherical device 1702 with a fixed mirror 1704.

Figure 18:
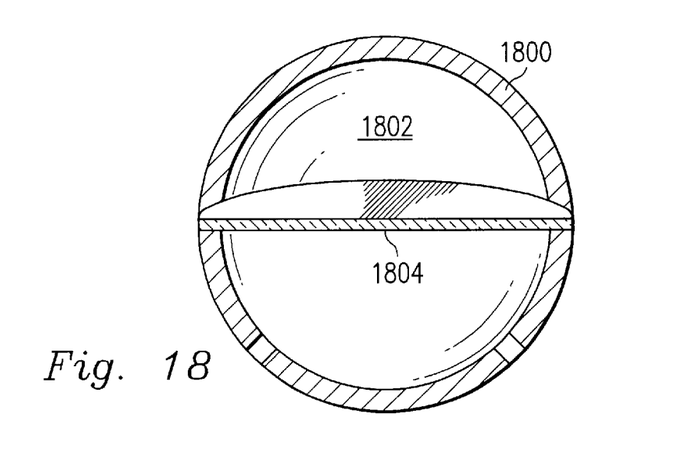
FIG. 18 is a diagram of yet another example embodiment.

FIG. 18 shows another embodiment of a spherical device 1800 with a cavity 1802 in the center and a center portion 1804 that acts as a mirror. The mirror 1804 can be comprised of a metal film or an elastic material that joins the two hemispheres. In the case of an elastic material, preferably it would be composed of a material that changes it's index of refraction when it expands.

Figure 19:
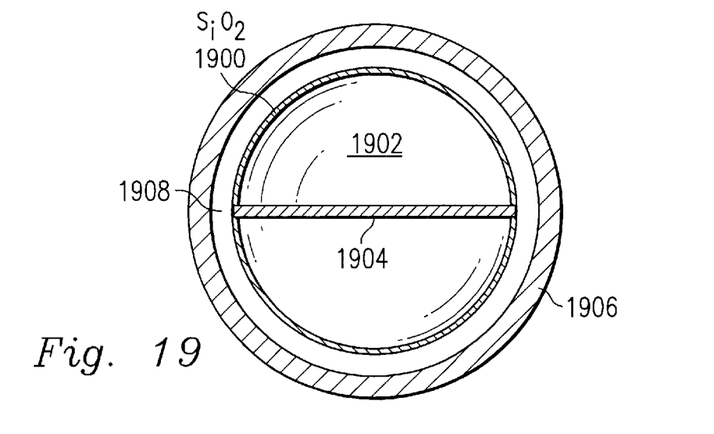
FIG. 19 is a diagram of yet another example embodiment.

FIG. 19 shows an example of an embodiment with the inner sphere 1900 of SiO2 that has a cavity 1902 within the sphere 1900 and mirror 1904 composed of metal film. The inner sphere 1900 is within an outer sphere 1906 and has a cavity 1908 between both spheres.

Figure 20:
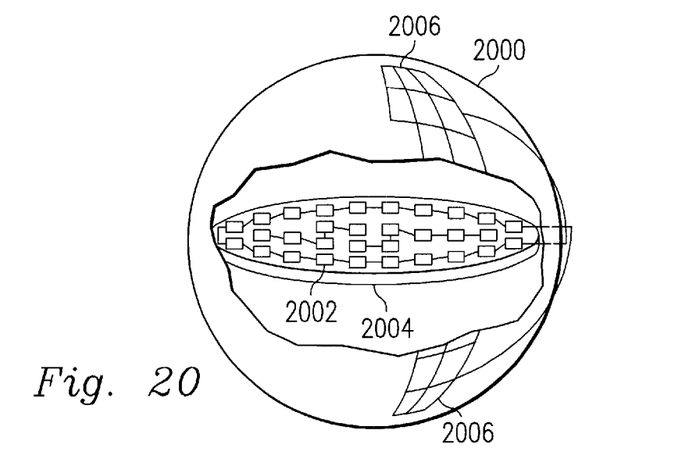
FIG. 20 is a diagram of yet another example embodiment.

FIG. 20 illustrates another embodiment of a sphere 2000 with sensors 2002 are placed on a mirror 2004 to gather information on an optical signal. The sensors 2002 shown are also connected to an integrated circuit 2006 on the substrate of the sphere 2000 such as disclosed in the incorporated by reference patent entitled "a method and system for manufacturing spherical-shaped semiconductor integrated circuits".

The sensors 2002 could gather all types of information on optical signals such as phase, amplitude, wavelength and rate. Additionally, the sensors 2002 could be used to read the optical signal for various functions such as error checking. With the combination the sensors 2002 and the integrated circuit 2006, the spherical optical switch 2000 becomes an intelligent optical switch that can be expanded to a multitude of functions.

Figure 21:
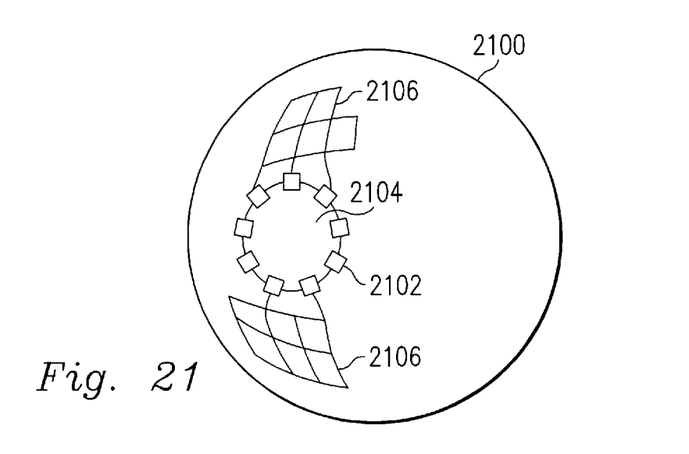
FIG. 21 is a diagram of yet another example embodiment.

FIG. 21 illustrates a sphere 2100 with sensors 2102 placed on the flat polished areas 2104 instead or in addition to sensors on a mirror. The sensors 2102 would also be connected to an integrated circuit 2106 in this embodiment.

Figure 22:
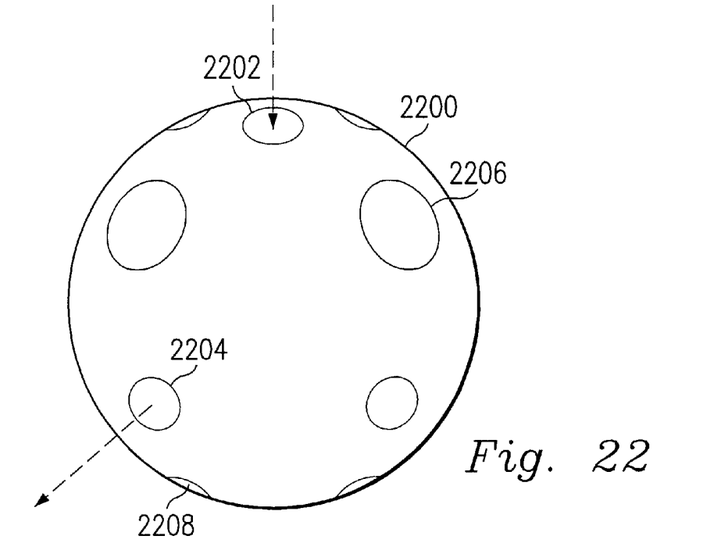
FIG. 22 is a diagram of yet another example embodiment.

FIG. 22 illustrates another embodiment. This sphere 2200 includes a polished flat area 2202 receiving an incoming optical signal, and a polished flat area 2204 where the corresponding outgoing optical signal exits the sphere 2200. Additionally, this switch is designed with material that changes its index of refraction upon a standing wave created when portions 2206 and 2208 of piezo-electric (PZT) material are activated.

Figure 23:
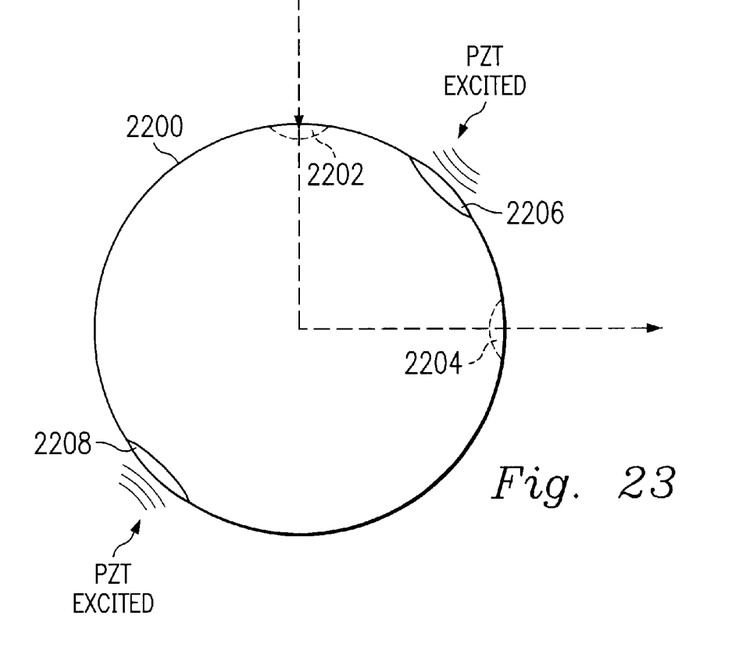
FIG. 23 is a cross sectional diagram of the example embodiment in FIG. 22.

FIG. 23 illustrates a cut-out portion of the sphere 2200 as the portions of PZT 2206 and 2208 are activated. In this example, the standing wave compresses the material of the sphere causing it to changes its index of refraction in order to redirect the incoming signal. Although the example illustrates a ninety degree turn, almost any angle could be implemented depending on material used and how much pressure the standing wave creates on the material.

It is understood that several variations may be made in the foregoing. For example, the spheres can be made of other materials used in conventional semiconductor processing. Additionally, any spherical lens effect can be compensated by the design of grating. Some materials for the sphere/hemisphere are silicon for longer wavelengths, fused silicon for shorter wavelength, optical glass and acrylic glass. Although, the silicon spheres are usually ground to cut them in half, the optical glass and acrylic glass can be molded into a hemisphere or ground in half.

The mirror can be composed of a metal layer, liquid crystal, and/or an air gap that is turned on and off by pressure. Additionally, a piezo electric material can be placed on the periphery of a center cut portion with a gap in center that can be filled with gas or liquid from outside the sphere. Moreover, an elastic material could be placed on the periphery of a center cut portion with similar materials to fill the gap as the piezo electric embodiment.

Further, a material that changes index of refraction upon electric charge, magnetic field or ultrasonic sound could replace the mirror area of the sphere.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An optical switch utilizing a spherical shaped device, the switch comprising:
    an optical transmission path having an optical transmission medium, an input-side end and a first and a second output-side end;
    a radiation source associated with said input-side end for emitting a primary optical signal being coupled into said transmission path;
    a reflection device within the spherical device for receiving the primary optical signal and converting the primary optical signal into a secondary, modulated optical signal being reflected and coupled back into the second output-side end when the reflection device is on and wherein the primary optical signal is coupled into the first output-side end when the reflection device is off;
    a reflection device is included in an inner sphere within the spherical device and wherein the reflection device moves in order for the primary signal to reflected and coupled back into the second output-side end.

2. The optical switch according to claim 1, wherein the switch is included within an array of similar switches within a plane.

3. The optical switch according to claim 2, wherein the array is included within a plurality of similar arrays within at least a second plane.

4. An optical switch utilizing a spherical shaped device, the switch comprising:
    an optical transmission path having an optical transmission medium, an input-side end and a first and a second output-side end;
    a radiation source associated with said input-side end for emitting a primary optical signal being coupled into said transmission path;
    a first grating pattern on the spherical device for receiving the primary optical signal and converting the primary optical signal into a secondary, modulated optical signal being coupled back into the second output-side end when the grating pattern is on and wherein the primary optical signal is coupled into the first output-side end when the grating pattern is off.

5. The optical switch of claim 4, further including a second grating pattern on an opposite side of the spherical device from the first grating pattern.

6. The optical switch of claim 4, wherein the switch is included within an array of similar switches within a plane.

7. The optical switch of claim 6, wherein the array is included within a plurality of similar arrays within at least a second plane.

8. The optical switch of claim 4, wherein the first grating pattern demodulates the primary signal by time.

9. The optical switch of claim 4, wherein the first grating pattern demodulates the primary signal by wavelength.

10. The optical switch of claim 4, wherein the first grating pattern demodulates the primary signal by a range of wavelengths.

11. The optical switch of claim 4, wherein the first grating pattern demodulates the primary signal by amplitude.

12. The optical switch of claim 4, wherein the first grating pattern demodulates the primary signal by phase.

13. The optical switch of claim 4, wherein the first grating pattern is etched directly on a substrate surface of the spherical device.

14. The optical switch of claim 4, wherein the first grating pattern is formed on a substrate surface of the spherical device by chemical vapor deposition.

15. The optical switch of claim 4, wherein the first grating pattern is formed on a substrate surface of the spherical device by photolithography.

16. The optical switch of claim 4, wherein the spherical device is composed of silicon.

17. The optical switch of claim 4, wherein the spherical device is composed of fused silicon.

18. The optical switch of claim 4, wherein the spherical device is composed of optical glass.

19. The optical switch of claim 4, wherein the spherical device is composed of acrylic glass.

20. An optical switch utilizing a spherical shaped device, the switch comprising:

an optical transmission path having an optical transmission medium, an input-side end and a first and a second output-side end;

a radiation source associated with said input-side end for emitting a primary optical signal being coupled into said transmission path;

a reflection device within the spherical device for receiving the primary optical signal and converting the primary optical signal into a secondary, modulated optical signal being reflected and coupled back into the second output-side end when the reflection device is on and wherein the primary optical signal is coupled into the first output-side end when the reflection device is off; further including a plurality of photo sensors on the sphere.

21. An optical switch utilizing a spherical shaped device, the switch comprising:

an optical transmission path having an optical transmission medium, an input-side end and a first and a second output-side end;

a radiation source associated with said input-side end for emitting a primary optical signal being coupled into said transmission path;

a reflection device within the spherical device for receiving the primary optical signal and converting the primary optical signal into a secondary, modulated optical signal being reflected and coupled back into the second output-side end when the reflection device is on and wherein the primary optical signal is coupled into the first output-side end when the reflection device is off; further including an integrated circuit on the sphere.

22. The optical switch of claim 4, further including a plurality of photo sensors on the sphere.

23. The optical switch of claim 4, further including an integrated circuit on the sphere.

24. The optical switch of claim 3, further including a temperature control device.

25. The optical switch of claim 7, further including a temperature control device.

* * * * *